United States Patent [19]
Snitzer et al.

[11] 4,300,816
[45] Nov. 17, 1981

[54] WIDE BAND MULTICORE OPTICAL FIBER

[75] Inventors: Elias Snitzer, West Hartford; Gerald Meltz, Avon, both of Conn.

[73] Assignee: United Technologies Corporation, Hartford, Conn.

[21] Appl. No.: 71,513

[22] Filed: Aug. 30, 1979

[51] Int. Cl.³ .............................................. G02B 5/14
[52] U.S. Cl. ................................................. 350/96.33
[58] Field of Search ................................... 350/96.33

[56] References Cited
U.S. PATENT DOCUMENTS

| | | | |
|---|---|---|---|
| 3,823,996 | 7/1974 | Kompfner et al. | 350/96.33 |
| 4,070,091 | 1/1978 | Taylor | 350/96.33 |
| 4,134,642 | 1/1979 | Kapron et al. | 350/96.33 |

Primary Examiner—Stewart J. Levy
Attorney, Agent, or Firm—Richard P. Lange

[57] ABSTRACT

An optical waveguide having a plurality of cores disposed in a common cladding provides an optical fiber with both a wide bandwidth, by minimizing modal dispersion, and a large aperture to enhance light-carrying capacity. Each of the cores is sized to support only the lowest order mode, $HE_{11}$, and the intercore spacing is selected to achieve a required bandwidth. At the same time, the multiple cores provide a large aperture allowing a relatively large amount of light energy emitted from a noncoherent light source to be coupled into the optical fiber. An array factor $A_f$ is given which provides design criteria for the intercore spacing by providing an accurate calculation of the pulse spreading with a large number of cores beginning with a simple twin core fiber.

2 Claims, 8 Drawing Figures

WIDE BAND MULTICORE OPTICAL FIBER

BACKGROUND OF THE INVENTION

1. Field of the Invention

This invention relates generally to optical waveguide devices, and particularly to an optical waveguide having an array of single mode fiber cores positioned in a common cladding such that the optical channel has a particularly wide bandwidth and a large light-carrying capacity.

2. Description of the Prior Art

Optical waveguides have been known for many years and, with the advent of low loss glasses, devices incorporating optical waveguides have been employed in ever-increasing numbers, in many different fields, such as communications and monitors. An optical waveguide typically consists of a dielectric core fabricated from a glass, or the like, having a certain index of refraction, and this core is surrounded by a second material, also normally glass or the like, having a lower refractive index. This surrounding material is generally known as the cladding. A beam of light is guided by this composite structure so long as the refractive index of the material comprising the core exceeds the refractive index of the material forming the cladding. A light beam within the core is guided generally along the core axis by total internal reflection at the boundary between the core and cladding.

A number of different designs for optical waveguides have been proposed including the multimode step index profile, the single mode profile, and the multimode graded index profile. In the multimode step index design, the core typically has a relatively large diameter and is fabricated from a homogenous material having a high refractive index. The cladding is also fabricated from a homogenous material which has a sufficiently lower refractive index such that the difference between the refractive indices of the core material and cladding material is typically of the order of $10^{-2}$ to $10^{-1}$. Because the diameter of the core is large with respect to the wavelength of light, i.e. typically on the order of 50–500 μm, many modes exist in the waveguide when illuminated. Because each mode as it propagates through the waveguide will experience a slightly different delay, a condition known as modal dispersion occurs which increases the duration of a light pulse propagating through the waveguide and leads to a loss in high frequency information in the light signal.

In the single mode optical waveguide, the diameter of the core is typically less than 10 μm and the difference between the refractive indices of the core and the cladding is of the order of $10^{-3}$. As a result only the lowest order mode will be supported in the waveguide. Because of the small numerical aperture and small core diameter of the waveguide, only a small portion of the light emanating from an incoherent source will be coupled into the waveguide. In fact, with the typical light emitting diodes available at this time, the amount of energy coupled into the optical waveguide is on the order of $10^{-4}$.

The multimode graded index optical waveguide was developed to retain a high input coupling capability associated with a large numerical aperture and core diameter while at the same time attempting to minimize the modal dispersion losses associated with the propagation of a pulse having a number of modes, each of which propagates at a different velocity. The core of the waveguide is fabricated such that the core does not have a constant refractive index but decreases across the radius of the core with the axis of the core having the highest refractive index. Although there is considerably less modal dispersion in the graded index optical fiber when compared to the multimode step index optical fiber, there is still some dispersion because the gradient in index required for the axial rays is different from that required for the skewed rays. In addition, only a portion of the theoretical improvement in channel bandwidth has been realized because of manufacturing tolerances associated with the fabrication of a core having a core profile with a precisely graded refractive index.

SUMMARY OF THE INVENTION

It is an object of the present invention to provide an optical waveguide which has a greater bandwidth than currently available, and yet to provide sufficiently large aperture such that the optical waveguide couples a high percentage of energy emanating from a noncoherent source into the waveguide itself.

It is another object of the present invention to provide an optical waveguide which is particularly well suited to operating with low cost, inexpensive, noncoherent light sources, such as an LED, or the like, and to provide a broader bandwidth than has been heretofore possible while coupling a significant portion of the radiated light energy into the fiber.

A particular feature of the optical waveguide according to the present invention is to provide a multimode fiber having a number of cores in a single cladding forming an optical channel with less modal dispersion than heretofore possible while maximizing the amount of light energy that can be coupled into the optical channel. Furthermore, the spacing between the cores of the multicore array is selected to just reduce multipath dispersion below a desired limit so that the maximum packing fraction is obtained. The required spacing is of the order of a core diameter, therefore, a large packing fraction is realized.

It is yet another feature of the present invention to provide a wide bandwidth optical channel which is particularly well suited for use with monitoring devices, such as temperature sensors, so that a high degree of resolution is possible.

DETAILED DESCRIPTION OF THE ILLUSTRATED EMBODIMENT

Figure 1:
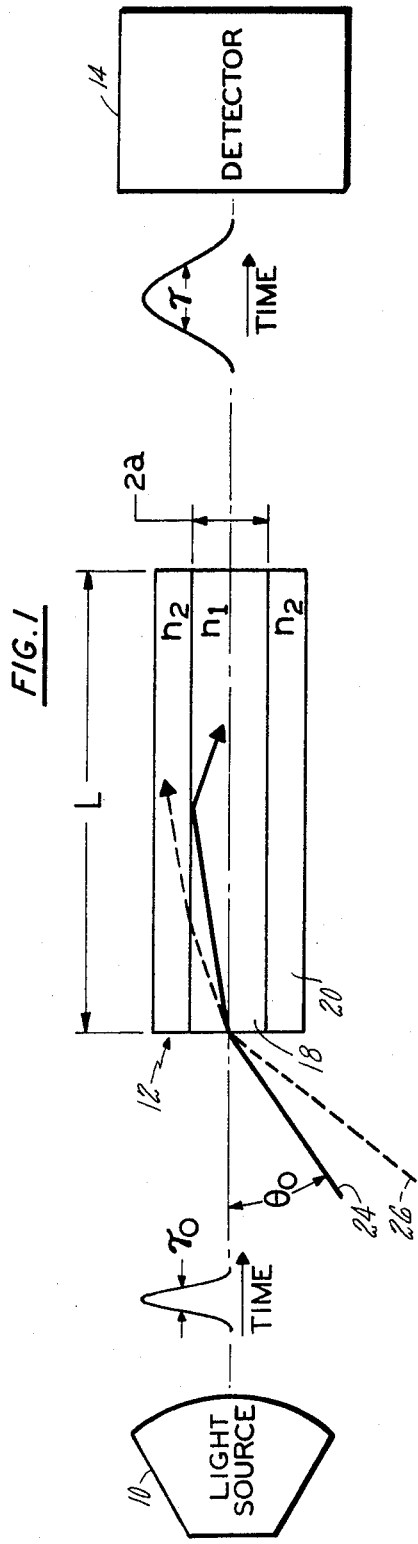
FIG. 1 is an enlarged schematic illustration, in axial section, of an optical fiber having a single core surrounded by a cladding which together with a light source and detector constitute a fiber optic communication link.
Figure 3D:
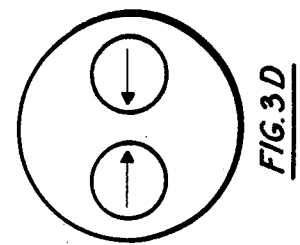
FIGS. 3A–3D are a schematic illustration of possible modes in a two core optical fiber.
Figure 3C:
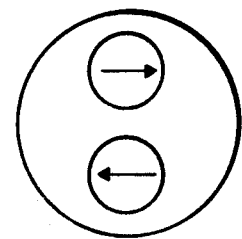
Figure 3B:
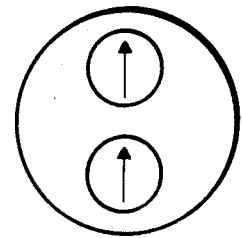
Figure 3A:
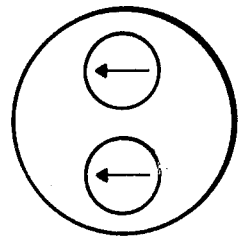

Referring to FIG. 1, there is seen the basic components of many known systems which utilize conventional optical waveguides. All such systems include a light source 10, which may be an incoherent source, such as an LED or the like, or even a coherent source such as a laser, an optical waveguide 12 which forms an optical channel through which the light energy propagates, and a sensor 14 which responds to the energy impinging thereon. The light source 10 emits an energy beam, a portion of which is coupled through the waveguide 12 to the sensor 14 where the characteristics of the impinging energy are employed.

The bandwidth of the optical waveguide 12 is critical to the operation of a system in which it is employed regardless of whether it is a communication system or a monitoring system. The bandwidth of the optical waveguide in the former case is typically the major parameter which defines the overall capacity of the communication system and in the latter case is the major factor in system sensitivity. The reasons for the bandwidth limitation of conventional optical waveguides will be more apparent from the following discussion. The light source 10 emits a light pulse 16 having a certain pulse duration $\tau_0$ for transmission by the waveguide 12. The optical waveguide 12 includes a core 18 which is normally cylindrically shaped and fabricated from a glass or the like, and a cladding 20, also typically fabricated from glass or the like, which totally surrounds the core. A jacket (not shown) may be provided and would be constructed of, for example, plastic such as polyvinylchloride. The jacket positioned over the cladding for protection against scuffing and abrasion.

So long as the refractive index of the cladding 20 is greater than the refractive index of the core 18, the energy from the light pulse 16 will propagate through the waveguide 12. The number of distinct modes that will exist in the core 18 is a function of the refractive indices of both the core material and the cladding material, the radius of the core, and the wavelength of the light emitted by the light source 10. For a circular cross section for the core, the number of modes that can exist is determined by the value of the V parameter defined by:

$$V = 2\pi (a/\lambda) \sqrt{n_1^2 - n_2^2} \qquad (1)$$

where a is the core radius, $\lambda$ is the light wavelength, $n_1$ is the refractive index of the core, and $n_2$ is the refractive index of the cladding. If V is less than 2.405 (the first zero of the Bessel function, $\tau_0$) then only the lowest order mode, known as the $HE_{11}$ mode, can be supported. For values of V that are much larger than 2.405, this occurring when the diameter d of the core 18 is much larger or the difference between refractive indices of the core and that of the cladding is much greater, then many modes will be supported in the waveguide 12. The significance of the number of supported modes is that in the single mode cases, i.e. V less than 2.405, the waveguide experiences only chromatic dispersion which is relatively much smaller, whereas in the multimode case, that is V greater than 2.405, modal dispersion occurs which significantly limits the bandwidth of the optical waveguide.

The modal dispersion, that is the spreading of a light pulse in the waveguide 20 due to propagation in the different modes, can probably best be visualized by considering the nature of light propagation in the optical waveguide 12. Referring still to FIG. 1, when a pulse of light 16 with a pulse duration of $\tau_0$ travels through the optical waveguide 12, there is a transit time associated with the propagation of the light in a given mode. This transit time differs for the different modes in which the light is propagated. A mode is a distribution of light intensity and polarization which for a given wavelength of light propagates down the fiber at a well defined velocity. For the purposes of the present discussion, it is sufficient to note that the range of possible modal velocities is equivalent to the range obtained for the times required for different light rays to propagate down the fiber. The maximum possible difference in pathlengths of two distinct optical ray patterns is determined by the maximum angle that a ray can make with the guide axis and still be confined by the total internal reflection at the core-cladding interface. In other words, light incident on the end surface of the waveguide 12 in a direction with respect to the waveguide axis no greater than a certain angle $\theta_0$, indicated in the drawing by ray 24, would be confined within the core of the waveguide, whereas a beam incident on the end surface of the core at greater angles, such as along ray 26, would represent coupling losses. In addition, modal dispersion losses for high frequency information are due to the spreading of the pulse associated with the propagation of the different modes supported in the waveguide. This can be visualized as the difference in transit times of the shortest path in the core 18, i.e. along the axis of the core, versus the longest path, i.e. that of a beam incident along the ray 24, this path being that of the maximum angle for zig-zag rays that are guided by the waveguide through total internal reflection.

It should be noted that the width of the input pulse $\tau_0$ is small with respect to the modal dispersion $\tau$ such that the input pulse width, $\tau_0$, can in many situations be neglected and the system bandwidth is then defined by the modal dispersion, $\tau$. The duration of the pulse as it emerges from the waveguide 12 is given by the following:

$$\tau = (n_a L/c)\Delta \qquad (2)$$

where c is the velocity of light in a vacuum, $n_a$ is the average index of the sum of the refraction indices of the core and cladding divided by 2, and $\Delta$ is the normalized index difference or the difference between the refraction indices divided by the average index. A typical value for the modal dispersion $\tau$ for step index fibers used in the telecommunication field would be 50 nanoseconds per kilometer length of waveguide. This quantity translates into a bandwidth for the optical waveguide of 20 megahertz kilometer as follows:

$$\text{Bandwidth} = 1/\tau \qquad (3)$$

As Mentioned the graded index fiber was developed to improve the bandwidth capability of the optical waveguide while still retaining the advantage associated with a large aperture core structure that supports multiple modes. In that the index of refraction of the core is highest along the core axis and decreases toward the cladding, modal dispersion losses are considerably less than with a step index waveguide. This can probably be visualized by considering the structure of FIG. 1, with a light beam entering the waveguide along a direction with respect to the core axis such as to have the maximum angle with respect to the core axis and still have total internal reflection, i.e. ray 24. Although this ray experiences a zig-zag path, which is now rounded as the ray approaches the core-cladding interface due to the gradient in refractive index, this ray has a longer physical path within the waveguide, but the major portion of this path is in a region of the core with a lower refractive index away from the core axis. At the same time, the ray that enters along the axis travels the shortest physical path but the path is along the axis of the core which has the highest refractive index. The net result is that the optical pathlengths presented to the respective rays are approximately equal where the optical pathlength is defined as the sum of the products of refractive index times the pathlength for each section of the path. However, there is still some dispersion, because the refractive index as a function of distance from the center of the core that is required to make the optical pathlengths for the rays which intersect the axis with different values of the angle $\theta$ equal, is different from the refractive index variation required to make the various spiral paths have the same optical pathlength. The spiral paths through the core do not intersect the core axis. Accordingly, the best theoretical value of $\tau$ that is reasonably achievable with a graded index core is greater than the value given by chromatic dispersion. In practice, because of the limited precision with which a core with a precisely graded refraction index can be fabricated, the reasonably achievable bandwidth of a graded index type of optical waveguide is a value for $\tau$ of 0.5 nanoseconds or a bandwidth of two gigahertz kilometer for light with a wavelength of 0.8 to 0.9 $\mu m$.

The wide band multimode optical waveguide of the present invention provides an optical bandwidth which is a significant improvement over that realizable with the currently available graded index type of waveguide. This bandwidth improvement is due primarily to the lower modal dispersion which results in a minimized spread in the light pulses propagating through the waveguide. The multicore array of the present invention located in a common cladding reduces the modal dispersion without restricting the light-carrying capacity of the waveguide as is the case with a single mode waveguide. The distance separating the cores in the array of the present invention is as small as possible to allow a maximum packing fraction while being sufficiently spaced apart to reduce the modal dispersion to acceptable levels. Each core is sized to be just small enough to support only the lowest order mode, the $HE_{11}$ mode. As a pulse of light propagates along the axis of each single core in the array, about 20% of the Poynting flux in this lowest order mode is carried by the cladding. Because of this relatively small penetration of the flux into the cladding, a relatively close spacing can be tolerated, and a consequent beneficial high-packing fraction can be achieved, without introducing excessive cross-talk into adjacent cores which would increase the modal dispersion.

Figure 2:
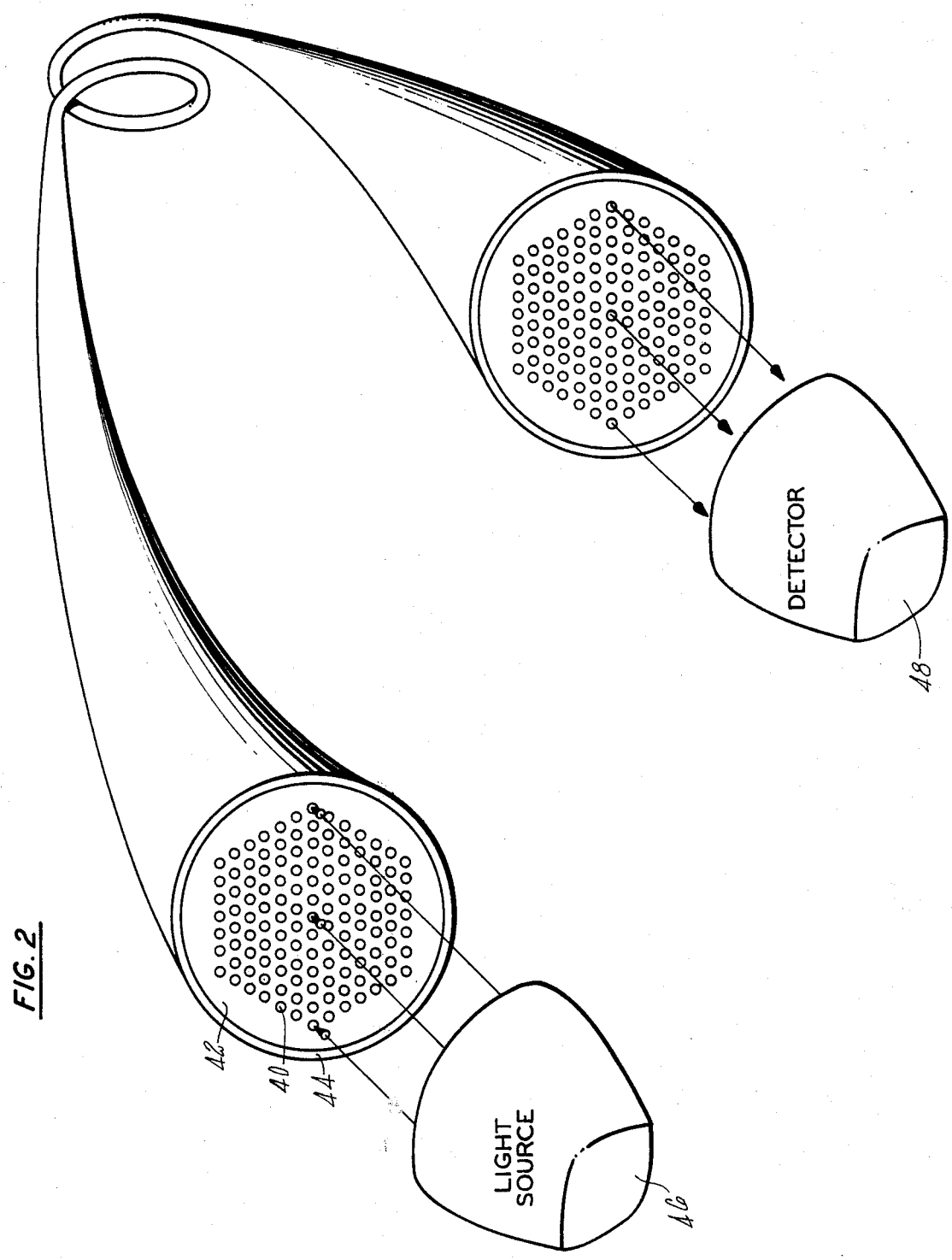
FIG. 2 is a schematic illustration of one embodiment of a wide band multicore optical fiber according to the present invention.

Referring now to FIG. 2, there is seen one embodiment of a system using a multicore optical waveguide according to the present invention. The particular embodiment includes a plurality of cores 40 positioned in a convenient geometric configuration in a cladding 42. A jacket 44 may be provided and would surround the cladding 42. The delay experienced by a light pulse propagating through this optical waveguide is a function of the individual core size, spacing, physical arrangement of the array and the material characteristics. If all of the cores are of equal diameter, formed from a material with the same refractive index and the spacings between adjacent cores in the array are equal, then the interaction between the cores can readily be analyzed by considering only the interaction between adjacent cores.

An incoherent quasi-monochromatic source 46 directing a light pulse at a waveguide having an array of the type shown in FIG. 2 will excite a combination of the lowest order $HE_{11}$ modes on the different cores 40, which propagates along the axis of the fiber to the detector 48.

To further analyze the modes of the composite waveguide made up of separate identical cores each just small enough to support only the lowest order $HE_{11}$ mode, consider the case of only two such cores, as shown in FIG. 3. The four normal modes which can be guided for the twin core fiber are plane polarized with transverse E-field aligned parallel or perpendicular to a line connecting the centers of the cores. Referring additionally to FIG. 3, the four modes comprise two orthogonally polarized pairs, a symmetric pair, FIG. 3A and FIG. 3B, and an anti-symmetric pair, FIG. 3C and FIG. 3D. The specific pair that will be supported in the adjacent cores is dependent upon the polarization of the light incident on the end surface of the cores. For example, if the illumination is polarized normal to a line connecting the center of the cores, then the modes shown in FIG. 3A or FIG. 3C are excited. The choice as to whether the symmetric mode, FIG. 3A, or anti-symmetric mode, FIG. 3C, is excited depends on the relative phase of the light incident on the two cores. If the illumination incident on the pair of cores is of random phase excitation of unpolarized light, as would be the case with an unpolarized incoherent light source, then both the symmetric modes and the anti-symmetric modes of both polarizations are excited in the cores. If only one of the two cores is excited by the light pulse with one polarization, then both the symmetric mode and the anti-symmetric mode of that polarization are excited in an in-phase state with essentially equal amplitudes. The symmetric and the anti-symmetric mode in the two adjacent cores have different phase velocities such that at periodic intervals along the waveguide, the two modes will be exactly out-of-phase with the apparent effect that the light energy will have all transferred to the second core. Intermediate of these out-of-phase points all of the light energy will appear to be in the other of the two adjacent cores. Of course, between these two extremes, there will be some light in both cores. In effect, this modal interference can be visualized as a beat phenomena which produces a spatial interference that can be viewed as an energy exchange between the two adjacent cores. Modal dispersion results because of the difference in velocity of propagation of the symmetric mode versus the anti-symmetric mode. The closer the cores, the stronger the interaction, the more rapidly as a function of waveguide distance will the energy cross-talk between cores, and the greater the modal dispersion. If both cores are uniformly illuminated in an in-phase condition of one polarization, then only the single symmetric mode of that polarization will be launched and no modal dispersion will be present because only one mode is excited. However, because of the inherent nature of unpolarized natural light sources, both symmetry modes of both polarizations will normally be excited.

To further describe the dispersion in a multicore optical waveguide constructed in accordance with the present invention, consider the propagation characteristics of a waveguide having for a given mode a phase refractive index of $n_p$ and a group refractive index of $n_g$. The phase refractive index is the ratio of the velocity of light in vacuum compared to the phase velocity of the propagation in a given mode. The group refractive index $n_g$ is the ratio of the velocity of light in vacuum compared to the group velocity supported by a given waveguide mode. The angular phase shift per unit length can then be calculated by the equation:

$$\beta = k \, n_p \qquad (4)$$

and $$n_g = \partial \beta / \partial k \qquad (5)$$

where $k = 2\pi$ divided by the free space wavelength. Both the size of each core and the spacing between adjacent cores are important. The manner for determining these parameters will now be described. Initially, the wavelength of light $\lambda$ which will be propagating through the waveguide is selected. Then the materials for the core and cladding are selected so that both the refractive index of the core $n_1$ and the refractive index of the cladding $n_2$ are known and have a relatively small difference, i.e. $n_1 - n_2$ equal approximately $10^{-2}$ to $10^{-3}$. Next, with reference to equation (1) V is set to be equal to 2.400 and the equation is solved for $2a$ which is the diameter of each core in the array. Here it should be noted that it is desirable to have the core as large as possible, i.e. V as close as possible to 2.405 but still less than 2.405, in order to enhance the light-carrying capability per unit area and to reduce coupling to the greatest extent for a given intercore spacing.

Figure 4:
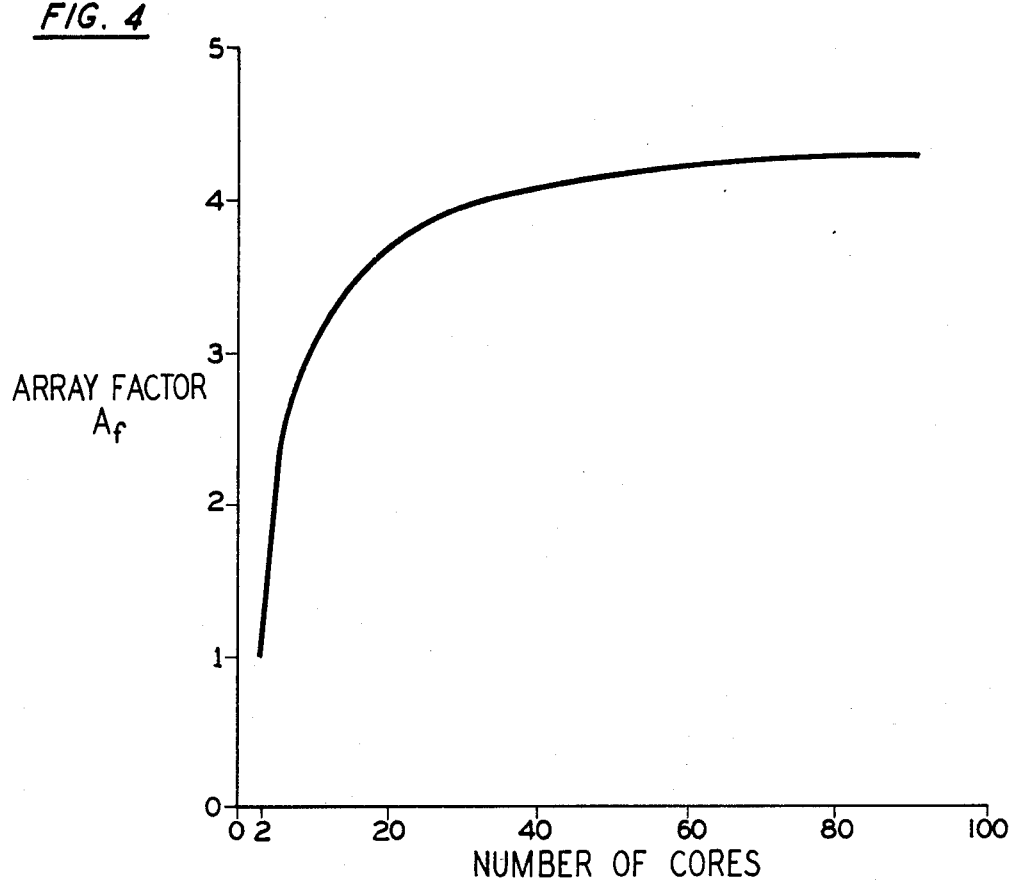
FIG. 4 is a graph which shows the relationship between the array factor, $A_f$, for a different number of cores in a multicore optical fiber according to the present invention.

Next, referring to FIG. 4, there is seen a plot of the array factor, $A_f$, versus the number of cores in a multicore fiber. This graph in essence indicates the modal dispersion that will exist as a function of the number of cores. The array factor $A_f$ then represents the amount of modal dispersion that can be expected starting with the simplest case of just two cores and extending upwards to one hundred cores. The modal dispersion of a twin core optical waveguide can be described in terms of the group refractive index $n_g^M$. This quantity is simply the ratio of the velocity of light to the group velocity for mode M. Let $n_g^\pm$ denote the group refractive indices of the symmetric and anti-symmetric modes of a twin core fiber, polarized normal to the line of centers. Similar results are obtained for the orthogonal polarization. With $\delta$ equal to $(1 - n_1^2/n_2^2)$, the pulse duration after traveling a distance $l$ in the multicore fiber for excitation with a much shorter duration pulse is given by $$\tau = 2A_f \left[ \sqrt{\delta} \cdot G_1 \frac{\partial F}{\partial V} + (2a)^{-1} \delta^{-1/2} G_2 F \right] \cdot L/c \qquad (6)$$

where $$F(V, d/a) = U^2/V^3 \cdot K_0[W \, d/a]/K_1^2(W), \qquad (7)$$

$$U = (1 + \sqrt{2}) V / [1 + (4 + V^4)^{1/4}], \text{ and} \qquad (8)$$

$$W = \sqrt{V^2 - U^2} \qquad (9)$$

The quantities $K_0$ and $K_1$ are modified Hankel functions of orders 0 and 1 respectively. The factors $G_1$ and $G_2$ depend only on the material parameters and not the relative core spacing and are given by $$G_1 = n_1 \sqrt{\delta} - \frac{\lambda}{2}(n_1^2 - n_2^2)^{-1/2} \partial/\partial \lambda \, (n_1^2 - n_2^2) \qquad (10)$$

$$G_2 = \lambda^3/\pi \left[ (n_1^2 - n_2^2)/(2\lambda n_1^4) \frac{\partial n_1^2}{\partial \lambda} - 1/(2\lambda n_1^2) \partial/\partial \lambda (n_1^2 - n_2^2) \right]$$

The foregoing procedure will now be illustrated for a typical case. Initially, consider the case where the wavelength of light propagating through the core has the value, $\lambda = 0.9 \, \mu m$. The core is to be fabricated from pure fused silica and the cladding is to be fabricated from 3 mole percent $B_2O_3$-97 mole percent $SiO_2$ so that the numerical aperture equal $\sqrt{n_1^2 - n_2^2}$ equals 0.06. By referring to equation (1) with $V = 2.400$, the core radius can be calculated for the $HE_{11}$ mode.

Figure 5:
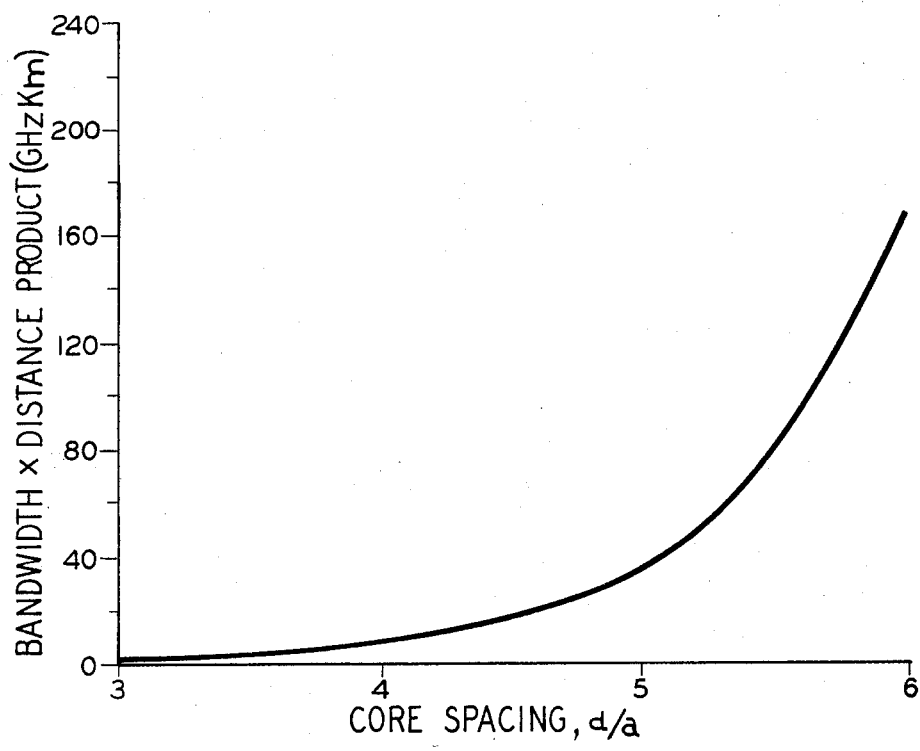
FIG. 5 is a graph showing the bandwidth of a particular multicore fiber according to the present invention for different core spacings.

An array of about 90 cores is selected to have the desired light-carrying capability and, with reference to FIG. 4, it can be seen that the array factor $A_f$ for this number of cores is approximately four; thus, the modal dispersion is anticipated to be four times as large as for the fiber with only two cores. Referring next to Equation (6), with the array factor $A_f$ set equal to 4.3, the modal dispersion associated with an array of 90 cores is now calculated as a function of core spacing d/a. This result is shown in FIG. 5. As is seen, the bandwidth is given as a function of core spacing.

In the illustration of this invention given above, an array of circular cores with low dispersion in the group velocity for a single core by virtue of the core being small enough to support only the lowest order $HE_{11}$ mode, were put close enough together to give a relatively large filling factor for light incident on the end of the fiber, but with the spacing between cores just great enough to provide a predetermined bandwidth which could for large spacing approach the bandwidth characteristic of a single core. The teaching of this invention includes the use of arrays of cores other than ones with circular cross-sections just small enough to support only the lowest order mode. The invention applies to these other cores in which the light carrying capacity is increased by the use of arrays in which the spacing between cores is just large enough to give the desired bandwidth, this desired bandwidth having less than that associated with a single core, and in this way obtaining a fiber with a large light carrying capacity, a large filling factor for indicent light and a broad bandwidth. An additional embodiment of the present invention may utilize arrays of cores of different sizes and material properties, such as refractive index, but where the group velocities are the same for the modes which can propagate in the different cores in the array and the spacing between cores is just large enough to give the maximum filling factor for incident light consistent with the required bandwidth.

Numerous manufacturing techniques are currently available for the fabrication of multicore optical waveguides and such techniques would be suitable for the manufacture of a wide band optical waveguide whose parameters were selected in accordance with the present invention. In one such technique known as the rod and tube method, a core glass is clad with a glass of lower refractive index. The diameter of this core-cladding combination at this point is about one to ten millimeters. These clad rods are then placed in a tube. The tube is then heated and a vacuum is applied to the interior of the tube causing it to collapse on the clad rods. The resulting composite preform can then be drawn down to the point where the cores are the appropriate size.

Although the invention has been shown and described with respect to the preferred embodiment thereof, it should be understood by those skilled in the art that various changes and omissions in the form and detail thereof may be made therein without departing from the spirit and the scope of the invention.

Having thus described typical embodiments of our invention, that which we claim as new and desire to secure by Letters Patent of the United States is:

1. An optical fiber, comprising:
a plurality of cores, identical in cross section size and material, located in a common cladding, said cores being dimensioned and fabricated from such material so as to support only the lowest order modes which has the same propagation properties for the two independent states of polarization, but where each core of said array is spaced from adjacent cores at a distance just sufficient to decrease the light energy cross-talk between cores as a function of distance to satisfy a predetermined bandwidth requirement on modal dispersion, thereby providing the maximum light-carrying capacity consistent with the predetermined light information bandwidth.

2. An optical fiber, comprising:
a plurality of identical cores located in a common cladding, all of which are identical in cross section size and material, each core being demensioned and fabricated from such material so as to support only the lowest order mode, which has the same propagation properties for the two independent states of polarization but where each core of said array is spaced from adjacent cores at a distance just sufficient to decrease the light energy cross-talk between cores as a function of distance to satisfy a predetermined bandwidth requirement on modal dispersion, thereby providing the maximum light-carrying capacity consistent with the predetermined light information bandwidth.

* * * * *